United States Patent [19]

Yamada

[11] Patent Number: 5,070,178

[45] Date of Patent: Dec. 3, 1991

[54] HIGHLY ELASTIC IONIC DYE-DYEABLE POLYETHER-ESTER BLOCK COPOLYMER FILAMENTS

[75] Inventors: Hironori Yamada, Matsuyama, Japan

[73] Assignee: Teijin Limited, Osaka, Japan

[21] Appl. No.: 577,808

[22] Filed: Sep. 4, 1990

Related U.S. Application Data

[63] Continuation of Ser. No. 425,734, Oct. 23, 1989, abandoned.

[30] Foreign Application Priority Data

Oct. 26, 1988 [JP] Japan .................. 63-268295

[51] Int. Cl.⁵ .................. C08G 63/688; C08G 63/692
[52] U.S. Cl. .................. 528/272; 528/286;
528/287; 528/294; 528/295; 528/298; 528/301;
528/302; 528/307; 528/308; 528/308.6;
528/398; 528/400; 525/437; 525/444; 525/448;
525/450; 524/709; 524/710
[58] Field of Search .............. 528/272, 286, 287, 294,
528/295, 298, 301, 302, 307, 308, 308.6, 398,
400; 525/437, 444, 448, 450; 524/709, 710

[56] References Cited

U.S. PATENT DOCUMENTS

| | | |
|---|---|---|
| 3,651,014 | 3/1972 | Witsiepe . |
| 3,732,183 | 5/1973 | Popp et al. ............. 528/287 |
| 4,006,123 | 2/1977 | Samuelson et al. ............. 528/287 |
| 4,006,123 | 2/1977 | Samuelson et al. ............. 528/287 |
| 4,855,396 | 8/1989 | Wilson et al. ............. 528/272 |

FOREIGN PATENT DOCUMENTS 0280026 8/1988 European Pat. Off. .
2044931 3/1972 Fed. Rep. of Germany .
60-163920 8/1985 Japan .
61-176682 8/1986 Japan .
63-037121 2/1988 Japan .

Primary Examiner—John Kight, III
Assistant Examiner—Sam A. Acquah
Attorney, Agent, or Firm—Burgess, Ryan & Wayne

[57] ABSTRACT

A polyether-ester block copolymer, and filaments formed therefrom, having an enhanced thermal stability of the elastic property thereof and a satisfactory dyeing property, comprises a polymerization product of (A) an acid component comprising as a major ingredient, terephthalic acid, (B) a phosphonium sulfate component comprising a compound of the formula (I):

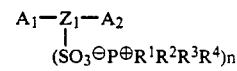

wherein $Z_1$=tri- or more valent aromatic or aliphatic group, $A_1$=ester-forming group, $A_2$=H or ester-forming group, $R^1$, $R^2$, $R^3$, $R^4$=alkyl or aryl radical and n=a positive integer, (C) a polymeric glycol component comprising a polyoxyalkylene glycol having an MW of 400 to 6000 and (D) a monomeric glycol component comprising, as a major ingredient, 1,4-butane diol, in which the copolymer component (B) is in an amount of from 0.1 to 5 molar % based on the molar amount of the component (A) and the component (C) is in an amount of from 50 to 80% by weight based on the total weight of the copolymer, and which copolymer has a limiting viscosity number of 1.2 or more, a melting point of 160° C. or more, and a ½ crystallization time of 10 seconds or less.

6 Claims, No Drawings

HIGHLY ELASTIC IONIC DYE-DYEABLE POLYETHER-ESTER BLOCK COPOLYMER FILAMENTS

This application is a continuation of application Ser. No. 425,734, filed Oct. 23, 1989, now abandoned.

BACKGROUND OF THE INVENTION

1. Field of the Invention

The present invention relates to a polyether-ester block copolymer and filaments formed therefrom.

More particularly, the present invention relates to a polyether-ester block copolymer useful for producing highly elastic, ionic dye-dyeable filaments having a high modulus of elasticity and a small permanent set and capable of maintaining the modulus of elasticity and the permanent set thereof substantially at the initial levels even after applying a dry or wet heat treatment thereto, and filament formed therefrom.

2. Description of the Related Art

It is known that rubbers and polyurethane resins are useful for forming elastic filaments. Those elastic rubber or polyurethane filaments are advantageous in that they have a high elastic recovery but disadvantageous in that they have an excessively high stretching property and a relatively poor resistance to heat and light.

Recently, polyether-ester block copolymers were developed and are now employed as an elastic resin material. These polyether-ester block copolymers are not satisfactory in that, when shaped into filaments, the resultant elastic filaments have a lower elastic recovery from elongation than the conventional polyurethane filaments. Nevertheless, the polyether-ester block copolymer has advantages in that the copolymer can be formed into filaments by a melt-spinning method and the resultant filaments exhibit a satisfactory elastic recovery from elongation at a small elongation rate.

The conventional polyether-ester block copolymer elastic filaments, in which the molecular chains are bonded through hard segment crystals in a different manner from the conventional polyurethane elastic filaments, are also disadvantageous in that they have a larger permanent set and a poorer elastic property than those of the conventional polyurethane elastic filaments.

Further, the conventional polyether-ester block copolymer elastic filaments are not dyeable by ionic dyes, and thus cannot be dyed with, for example, cationic dyes Although the conventional polyether-ester block copolymer elastic filaments can be dyed with disperse dyes, the resultant dyed filaments exhibit an unsatisfactory washing and light fastness.

To improve the elastic property of the polyether-ester block copolymers, Japanese Unexamined Patent Publication Nos. 59-45349 and 59-45350 disclose methods of enhancing the degree of crystallinity of the block copolymers by adding a crystal nucleating agent to the copolymers, but the improvements obtained by these methods with regard to the elastic property are not high enough, and thus the elastic property of the resultant filaments is still unsatisfactory. Especially, when the filaments are used to form a portion or a whole of a knitted fabric, the elastic property of the filaments is practically lost during the knitting procedure.

For an enhancement of the dyeing property, it is known that a polyethylene terephthalate can be copolymerized with a comonomer having a metal sulfonate radical, for example, sodium 5-sulfoisophthalate, and converted to a cationic dye-dyeable copolymer. Also, an attempt has been made to apply the above-mentioned dyeing property-enhancing method to the polyether-ester block copolymer. This attempt, however, was unsuccessful in that the metal sulfonate radical-containing comonomers have a very poor copolymerizing reactivity to the conventional polyether-ester block copolymers, especially when tetramethylene glycol is employed as an ingredient of the glycol component.

Accordingly, there is an urgent need for the provision of an improved polyether-ester block copolymer having a satisfactory elastic property and dyeing property, and filaments formed therefrom.

SUMMARY OF THE INVENTION

An object of the present invention is to provide a polyether-ester block copolymer useful for producing highly elastic, ionic dye-dyeable filaments having a high modulus of elasticity, a small permanent set, and a highly durable elastic property under dry and wet heat treatments, and filaments formed therefrom.

The above-mentioned object is realized by the polyether-ester block copolymer of the present invention, which comprises a polymerization product of:

(A) a dicarboxylic acid component comprising 70 to 100 molar % of at least one member selected from the group consisting of terephthalic acid and ester-forming derivatives thereof and 0 to 30 molar % of at least one member selected from additional dicarboxylic acids other than terephthalic acid and ester-forming derivative thereof;

(B) 0.1 to 5 molar %, based on the molar amount of the dicarboxylic acid component (A), of a phosphonium sulfonate component comprising at least one quaternary phosphonium sulfonate compound of the formula (I):

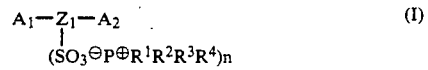

wherein $Z_1$ a member selected from the group consisting of tri- or more valent aromatic and aliphatic groups, $A_1$ represents an ester-forming functional group having a member selected from the group consisting of carboxyl and hydroxyl radicals and ester-forming derivatives thereof, $A_2$ represents a member selected from the group consisting of a hydrogen atom and ester-forming functional groups having a member selected from the group consisting of carboxyl and hydroxyl radicals and ester forming derivatives thereof, $R^1$, $R^2$, $R^3$ and $R^4$ represent, respectively and independently from each other, a member selected from the group consisting of alkyl radicals and aryl radicals, and n represents a positive integer;

(C) 50 to 80% by weight, based on a total weight of the copolymer of a polymeric glycol component comprising at least one polyoxyalkylene glycol having an average molecular weight of 400 to 6000; and (D) a monomeric glycol component comprising 70 to 100 molar % of at least one member selected from the group consisting of 1,4-butane diol and ester-forming derivatives thereof and 0 to 30 molar % of at least one member selected from the group consisting of additional aliphatic glycols other than 1,4-butane diol and ester-forming derivatives thereof, said glycol component (D) being in an amount necessary to cause the total molar equivalent of the hydroxyl radicals and ester-forming derivatives thereof in the components (B), (C) and (D) to be substantially equal to the total molar equivalent of the carboxyl radicals and ester-forming derivatives thereof in the components (A) and (B), and which has a limiting viscosity number of 1.2 or more, a melting point of 160° C. or more and a ½ crystallization time of 10 seconds or less at a temperature of 50° C. The filaments of the present invention comprise the above-mentioned polyether-ester block copolymer.

DESCRIPTION OF THE PREFERRED EMBODIMENT

The inventors of the present invention were engaged in research aimed at eliminating the disadvantages of the conventional polyether-ester block copolymer and filaments formed therefrom, i.e., the poor dyeing property, large permanent set, and unsatisfactory elastic property. Surprisingly, as a result of this research, the inventors found that, in the preparation of the polyether-ester block copolymer, specific quaternary phosphonium salts of organic sulfonic acids of the formula (I) can be utilized as a comonomer when a 1,4-butane diol or an ester-forming derivative thereof is used as a major ingredient of an monomeric glycol component.

Further, the inventors found that the filaments produced from the polyether-ester block copolymers of the present invention exhibit a high elastic property, a small permanent set, and a satisfactory dyeability by ionic dyes. Furthermore, the inventors found that the crystallization rate of the polyether-ester block copolymers can be controlled by controlling the proportions of the copolymerization components, and that the resultant polyether-ester block copolymers exhibit a high durability during dry and wet heat treatments.

The polyether-ester block copolymer of the present invention comprises a polymerization product of a dicarboxylic acid component (A), with a phosphonium sulfonate component (B), a polymeric glycol component (C) and a monomeric glycol component (D) in specific proportions.

The dicarboxylic acid component (A) comprises 70 to 100 molar %, preferably 80 to 100 molar %, of at least one member selected from the group consisting of terephthalic acid and ester-forming derivatives thereof, for example, dialkyl esters, in which the alkyl group has 1 to 4 carbon atoms, and diphenyl esters thereof and 0 to 30 molar % of preferably 0 to 20 molar %, of at least one member selected from additional dicarboxylic acids other than terephthalic acid, and ester-forming derivative thereof, for example, dialkyl esters in which the alkyl group has 1 to 4 carbon atoms and diphenyl esters thereof.

The additional dicarboxylic acids are preferably selected from aromatic dicarboxylic acids, for example, isophthalic acid, naphthalene dicarboxylic acids, diphenyldicarboxylic acids, diphenoxyethane dicarboxylic acids, β-hydroxyethoxybenzoic acid and p-hydroxybenzoic acid; aliphatic dicarboxylic acids, for example adipic acid and sebacic acid; and cycloaliphatic dicarboxylic acids, for example, 1,4-cyclohexane dicarboxylic acid.

The phosphonium sulfonate component (B) is used in an amount of 0.1 to 5 molar % based on the molar amount of the dicarboxylic acid component (A) and comprises at least one quaternary-phosphonium sulfonate compound of the formula (I):

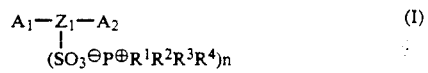

wherein $Z_1$ represents a member selected from the group consisting of tri- or more valent aromatic groups and aliphatic groups, $A_1$ represents an ester-forming functional group having a member selected from the group consisting of carboxyl and hydroxyl radicals and ester-forming derivatives thereof, $A_2$ represents a member selected from the group consisting of a hydrogen atom and ester-forming functional groups having a member selected from the group consisting of carboxyl and hydroxyl radicals and ester forming derivatives thereof, $R^1$, $R^2$, $R^3$ and $R^4$ represent, respectively and independently from each other, a member selected from the group consisting of alkyl radicals, preferably having 1 to 8 carbon atoms and aryl radicals, for example, phenyl, tolyl, naphthyl, and biphenyl radicals, and n represents a positive integer, usually of from 1 to 2.

The ester-forming functional groups represented by $A_1$ and $A_2$ in the formula (I) is selected respectively and independently from each other from the group consisting of those of the formulae:

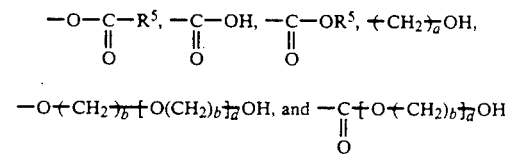

wherein $R^5$ represents a member selected from the groups consisting of lower alkyl radicals, preferably having 1 to 4 carbon atoms, and a phenyl radical, a and d, respectively represent an integer of 1 or more, and b represents an integer of 2 or more.

Preferably, $A_2$ in the formula (I) represents an ester-forming functional group as defined above.

The quaternary phosphonium sulfonate compounds represented by the formula (I) can be readily produced by the reaction of a corresponding organic sulfonic acid or a metal salt thereof with a quaternary phosphonium halide.

The phosphonium sulfonate compound of the formula (I) is preferably selected from the group consisting of tetrabutylphosphonium 3,5-dicarboxybenzene sulfonate, ethyltributylphosphonium 3,5-dicarboxybenzene sulfonate, benzyltributylphosphonium 3,5-dicarboxybenzene sulfonate, phenyltributylphosphonium 3,5-dicarboxybenzene sulfonate, tetraphenylphosphonium 3,5-dicarboxybenzene sulfonate, ethyltriphenylphosphonium 3,5-dicarboxybenzene sulfonate, butyltriphenylphosphonium 3,5-dicarboxybenzene sulfonate, benzyltriphenylphosphonium 3,5-dicarboxybenzene sulfonate, tetrabutylphosphonium 3,5-dicarbomethoxybenzene sulfonate, ethyltributylphosphonium 3,5-dicarbomethoxybenzene sulfonate, benzyltributylphosphonium 3,5-dicarbomethoxybenzene sulfonate, phenyltributylphosphonium 3,5-dicarbomethoxybenzene sulfonate, tetraphenylphosphonium 3,5-dicarbomethoxybenzene sulfonate, ethyltriphenylphosphonium 3,5-dicarbomethoxybenzene sulfonate, butyltriphenylphosphonium 3,5-dicarbomethoxybenzene sulfonate, benzyltriphenylphosphonium 3,5-dicarbomethoxybenzene sulfonate, tetrabutylphosphonium 3-carboxybenzene sulfonate tetraphenylphosphonium 3-carboxybenzene sulfonate, tetrabutylphosphonium 3-carbomethoxybenzene sulfonate, tetraphenylphosphonium 3-carbomethoxybenzene sulfonate, tetrabutylphosphonium 3,5-di($\beta$-hydroxyethoxycarbonyl)benzene sulfonate, tetraphenylphosphonium 3,5-di($\beta$-hydroxyethoxycarbonyl)benzene sulfonate, tetrabutylphosphonium 3-($\beta$-hydroxyethoxycarbonyl)benzene sulfonate, tetraphenylphosphonium 3-($\beta$-hydroxyethoxycarbonyl)benzene sulfonate, tetrabutylphosphonium 4-hydroxyethoxybenzene sulfonate, tetrabutylphosphonium 2,6-dicarboxynaphthalene-4-sulfonate, and tetrabutylphosphonium $\alpha$-sulfosuccinic acid.

In the polyether-ester block copolymers of the present invention, the quaternary phosphonium sulfonate compound of the formula (I) must be copolymerized as a component (B). If a conventional metal salt of organic sulfonic acid, for example, sodium salt of dimethyl isophthalate-5-sulfonic acid usable for importing a cationic dye-dyeability to the conventional polyethylene terephthalate, is used instead of the quaternary phosphonium sulfonate compound of the formula (I), the components (A), (C) and (D) are substantially not copolymerized with the conventional metal salt of the organic sulfonic acid, and thus an ionic dye-dyeable polyether-ester block copolymer cannot be obtained.

If the amount of the phosphonium sulfonate component (B) is less than 0.1 molar % based on the dicarboxylic acid component (A), the resultant copolymer is disadvantageous in that it exhibits an unsatisfactory dyeability by cationic dyes and an unsatisfactory permanent set and elastic property. Also, if the phosphonium sulfonate component (B) is used in a large amount of more than 5 molar % based on the dicarboxylic acid component (A), the resultant copolymer is disadvantageous in that it exhibits an excessively low melting point, a poor durability during dry and wet heat treatments, and an unsatisfactory elastic property. Also, an excessive increase in the content of the component (B) to more than 5 molar % has no effect on the enhancing of the dyeing property of the resultant copolymers.

The polymeric glycol component (C) comprises at least one polyoxyalkylene glycol having an average molecular weight of 400 to 6000, and is used in an amount of 50 to 80% by weight, preferably 50 to 70% by weight molar %, based on the total weight of the copolymer.

The polyoxyalkylene glycol in the polymeric component (C) is preferably selected from the group consisting of polyethylene glycols, polypropylene glycols, polytetramethylene glycols, and copolymers of the above-mentioned glycols, more preferably from polyoxyalkylene glycols comprising as major ingredients, polytetramethylene glycol and tetramethylene oxide recurring units.

If the amount of the polyoxyalkylene glycol component (C) is less than 50% based on the total weight of the copolymer, the resultant copolymer exhibits an unsatisfactory elastic property and a large permanent set. If the amount of the polyoxyalkylene glycol component (C) is more than 80% based on the total weight of the copolymer, the resultant copolymer exhibits an very low melting point and a poor durability of the elastic property during the dry and wet heat treatments, although the initial elastic property of the resultant copolymer is satisfactory.

When the average molecular weight of the polyoxyalkylene glycol is less than 400, the resultant copolymer exhibits a poor block-forming property, an unsatisfactory elastic property, a low melting point, and a poor durability of the elastic property during the dry and wet heat treatments. When the average molecular weight is more than 6000, the resultant copolymer exhibits a phase separation and a poor elastic property, and thus it is difficult to form a block copolymer.

The monomeric glycol component (D) comprises 70 to 100 molar %, preferably 80 to 100 molar %, of at least one member selected from the group consisting of 1,4-butane diol and ester-forming derivatives thereof, for example, diacetate, dipropionate, dibutanate and dibenzoate thereof and 0 to 30 molar %, preferably 0 to 20 molar %, of at least one member selected from the group consisting of additional aliphatic glycols other than 1,4-butane diol and ester forming derivatives of the above-mentioned glycols.

The additional aliphatic glycols are selected from the group consisting of ethylene glycol, 1,3-propane diol, 1,6-hexane diol, diethylene glycol, triethylene glycol and 1,4-cyclohexane dimethanol.

The glycol component (D) is used in an amount necessary to make the total molar equivalent of the hydroxyl radicals and ester-forming derivatives thereof in the component (B), (C) and (D) substantially equal to the total molar equivalent of the carboxyl radicals and ester-forming derivatives thereof in the components (A) and (B).

The polyether-ester block copolymer of the present invention has a limiting viscosity number of 1.2 or more preferably 1.3 to 1.7, determined at a concentration of 1.2 g/100 ml in a solvent consisting of o-chlorophenol at a temperature of 35° C., a melting point of 160° C. or more, preferably 180° to 195° C. and a ½ (half) crystallization time of 10 seconds or less, preferably 7 seconds or less, at a temperature of 50° C.

If the ½ crystallization time is more than 10 seconds at 50° C., the resultant polyether-ester block copolymer filament cannot contain crystals having a satisfactory large size even when the copolymer filaments are produced by a melt spinning procedure and drawn, and thus the bonding force of the molecular chains of the copolymer in the filaments is not satisfactory. Therefore, the resultant copolymer filaments exhibit a poor elastic property and a large permanent set.

To control the ½ crystallization time of the copolymer to the level of 10 seconds or less, the components (A) to (D) must be copolymerized in the above-mentioned amounts and the resultant copolymer must have a limiting viscosity number of 1.2 or more and a melting point of 160° C. or more.

If the limiting viscosity number is less than 1.2, the copolymer exhibits a ½ crystallization time of more than 10 seconds. If the amounts of the components (B) and (C) are reduced to increase the limiting viscosity number, the resultant copolymer exhibits a poor elastic property.

The limiting viscosity number of the copolymer is preferably controlled to a level of from 1.3 to 1.7. An excessively large limiting viscosity number causes difficulties in the melt-spinning of the resultant copolymer, and leads to excessively high costs.

Also, if the melting point is less than 160° C., the resultant copolymer exhibits not only an unsatisfactorily low durability of the elastic property during the dry and wet heat treatments, but also an excessively long ½ crystallization time of more than 10 seconds, which results in a poor elastic property.

The polyether-ester block copolymer of the present invention is prepared by copolymerizing the components (A), (B), (C) and (D) by a usual polyester copolymer-producing method. In practice, a reactor is charged with a mixture of a dicarboxylic acid component (A) with phosphonium sulfonate component (B), a polymeric glycol component (C) and a monomeric glycol component (D), the mixture is subjected, in the presence of a catalyst, to a direct esterification or an ester-interchange reaction, and then to a polymerization-condensation reaction under a high vacuum. The polymerization-condensation reaction is continued until the degree of polymerization of the resultant copolymer reaches a predetermined level.

The phosphonium sulfonate component (B) and the polymeric glycol component (C) may be charged into the reactor at any stage of the above-mentioned steps, for example, in the initial stage of the polymerization-condensation reaction step.

The polyether-ester block copolymer of the present invention can be converted to filaments or fibers by melt-spinning at a temperature of from 230° to 270° C., and optionally, by heat treating at a temperature of from 50° C. to 250° C.

In the polyether-ester block copolymer filaments of the present invention, the copolymer may be mixed with an additive comprising at least one member selected from delustering agents, pigments, for example, carbon black, antioxidants, for example, hindered phenol compounds and hindered amine compounds, and ultraviolet absorbers, for example, UV-absorbing benzophenone compounds, UV-absorbing benzotriazole compounds, and UV-absorbing salicylate compounds.

As described above, the component (B) comprising the specific quaternary phosphonium sulfonate compound of the formula (I) can be copolymerized at a high efficiency with the dicarboxylic acid component (A), the polymeric glycol component (C), and the monomeric glycol component (D) when the component (D) comprises, as a major ingredient, 1,4-butane diol or an ester-forming derivative thereof. The reasons for the above-mentioned phenomenon are not completely clear, but it is assumed that the specific phosphonium sulfonate compound of the formula (I) having a high bulkines has a higher solubility or compatibility with the blocks comprising the components (A), (C), and (D) than that of the conventional metal cationic compounds.

The polyether-ester block copolymer filaments of the present invention exhibit a satisfactory dyeing property by cationic dyes, and surprisingly, an enhanced elastic property, although the quaternary phosphonium sulfonate compounds cause the crystallizing rate of the resultant polyether-ester block copolymer to be lowered in the same manner as that of the dicarboxylic acid component (A). With regard to this phenomenon, it is assumed that the quaternary phosphonium compound, which has a large molecular size and volume, causes the resultant polyether-ester block copolymer to provide vacant spaces formed in the copolymer molecules, and that these vacant spaces can be compressed or expanded recovered in response to an external force applied to the copolymer, and thus a high elasticity can be imparted to the copolymer.

EXAMPLES

The present invention will be further explained by way of the following specific examples.

In the examples, the following tests were carried out.

1. Limiting viscosity number ($\eta$)

This was determined from a viscosity of the polymer measured at a concentration of the polymer of 0.6 g/50 ml in a solvent consisting of 0-chlorophenol, at a temperature of 35° C.

2. Melting point

This was determined from a melting peak temperature of the polymer measured at a heating rate of 20° C./min, using a differential thermal analyser (made by Du port, type 990).

3. Rate of crystallization ($\frac{1}{2}$ crystallization time)

This was measured by a depolarization intensity method, in the following manner.

A sample of polymer in an amount of about 20 mg was placed on a slide glass and fused at a temperature of 250° C. for one minute, to prepare a specimen. Then, the polymer in the specimen was fused again at a temperature of 250° C. for 2 minutes and immediately cooled to a temperature of 50° C. Thereafter, the crystallization rate of the polymer was measured by the above-mentioned depolarization intensity method.

4. The elastic property of the filaments were measured in the following manner.

(A) Instantaneous elastic recovery

A specimen having an original length of 10 cm was stretched at an elongation of 100% based on the original length thereof, under a load, maintained at the stretched condition for 5 seconds, the load was removed, and the length l of the specimen was measured.

The instantaneous elastic recovery IER of the specimen was calculated in accordance with the following equation;

$$IER\ (\%) = \frac{10 - (l - 10)}{10} \times 100$$

(B) Tensile modulus of elasticity.

This was determined in accordance with Japanese Industrial Standard (JIS) L1073 (1977) (Test method for synthetic fibers)

(C) Permanent set

A specimen having an original length of 10 cm was stretched at an elongation of 100% based on the original length of the specimen, under a load, maintained at the stretched condition for 4 hours under the load, the load was removed, and the length l' of the stretched specimen was measured.

The permanent set PS of the specimen was determined in accordance with the following equation;

$$PS = \frac{l' - 10}{10} \times 100$$

(D) Tensile strength and Ultimate elongation.

A specimen having a test length of 5 cm was stretched at a stretching rate of 1000 %/min and a load which was applied to the specimen and at which the specimen was broken, and an elongation of the specimen at which the specimen was broken, were measured.

EXAMPLES 1 TO 8 AND COMPARATIVE EXAMPLES 1 TO 6

In each of Examples 1 to 8 and Comparative Examples 1 to 6, a dicarboxylic acid component (A) consisting of dimethyl terephthalate in the amount shown in Table 1, a polymeric glycol component (C) consisting of polytetramethylene glycol having a number average molecular weight of 2000 in the amount shown in Table 1, 105 parts by weight of a monomeric glycol component (D) consisting of 1,4-butane diol, and 0.35 parts by weight of a catalyst consisting of tetrabutyl titanate were charged in a reactor and subjected to an ester interchange reaction at an inside temperature of 190° C. At the stage at which a by-product consisting of methyl alcohol in an amount of about 70% based on the stoichiometric amount thereof was distilled away, a phosphonium sulfonate component (B) consisting of the type of quaternary phosphonium sulfonate compound in the amount shown in Table 1 was added to the reactor, and the pressure in the reactor was reduced to 30 mmHg over a time of about 30 minutes, and then to 3 mmHg over a further time of 30 minutes, and thereafter, the reaction mixture in the reactor was heated at an inside temperature of 245° C. under a reduced pressure of 1 mmHg or less.

The resultant polyether-ester block copolymer had the properties as indicated in Table 1.

After drying, the copolymer was melted at a temperature of 260° C. and the copolymer melt was extruded at an extruding rate of 3.9 g/min through a spinneret having 3 spinning orifices, the resultant filamentary streams of the copolymer melt were solidified by cooling, and the solidified elastic copolymer filaments were taken up through two godet rolls and wound around a bobbin at a speed of 1500 m/min.

The properties of the elastic copolymer filaments are shown in Table 1.

The elastic copolymer filament yarns were dyed in a dyeing aqueous liquid containing 2%, based on the weight of the filament yarns, of a cationic dye consisting of a mixture of Cathilon CD-FRLH and Cathilon Blue CD-FBLH (Trademarks of cationic dyes manufactured by Hodogaya Kagaku K.K.) in a mixing weight ratio of 1:1, 3 g/l of sodium sulfate and 0.3 g/l of acetic acid, at a temperature of 120° C. for 60 minutes.

The brilliance of the resultant dyed yarns is shown in Table 1.

TABLE 1

| | Composition | | | | Properties of copolymer | | | |
|---|---|---|---|---|---|---|---|---|
| | Component | Component (B) | | | Component | Limiting | Melting | ½ Crystal- |
| Example | (A) | Type of | Amount | | (C) | viscosity | point | lization |
| No. | (wt part) | compound | wt part | Molar % | wt part | number | (°C.) | time (sec.) |
| Example 1 | 167.3 | 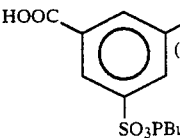 HOOC—⌬—COOH (II), SO₃PBu₄ | 4.3 | 1 | 60 | 1.25 | 186 | 5 |
| Example 2 | " | " | 8.7 | 2 | " | 1.40 | 183 | 7 |
| Example 3 | " | " | 21.7 | 5 | " | 1.35 | 174 | 9 |
| Example 4 | " | " | 1.3 | 0.3 | " | 1.38 | 187 | 3 |
| Comparative Example 1 | " | " | 26.1 | 6 | " | 1.39 | 168 | 12 |
| Comparative Example 2 | " | — | 0 | | 65 | 1.25 | 190 | 6 |
| Comparative Example 3 | " | — | 0 | | 70 | 1.30 | 182 | 8 |
| Comparative Example 4 | " | — | 0 | | 80 | 1.30 | 158 | 15 |
| Example 5 | " | " | 4.3 | 1 | 70 | 1.32 | 179 | 9 |
| Example 6 | " | Compound (II) | " | | 50 | 1.20 | 196 | 5 |
| Comparative Example 5 | 167.3 | — | 4.3 | | 45 | 1.25 | 199 | 3 |
| Example 7 | " | Compound (II) | " | | 65 | 1.30 | 182 | 9 |
| Comparative Example 6 | " | Compound (II) | " | | " | 1.10 | 182 | 7 |
| Example 8 | " | 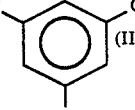 HOOC—⌬—COOH (III), SO₃PPh₄ | 5.0 | 1 | " | 1.30 | 183 | 8 |

| | Elastic properties of copolymer filaments | | | | | | | | | | | |
|---|---|---|---|---|---|---|---|---|---|---|---|---|
| | Before heat treatment | | | | | After dry heat treatment (*)1 | | | After wet heat treatment (*)2 | | | Bril- |
| | Instanta- | Tensile | | | Ulti- | Instanta- | | Ulti- | Instanta- | | Ulti- | liance |
| | neous | modulus | Perma- | | mate | neous | | mate | neous | | mate | of dyed |
| Example | elastic | of | nent | Tensile | elonga- | elastic | Tensile | elonga- | elastic | Tensile | elonga- | filament |
| No. | recovery (%) | elasticity (%) | set (%) | strength (g/d) | tion (%) | recovery (%) | strength (g/d) | tion (%) | recovery (%) | strength (g/d) | tion (%) | yarn |
| Example 1 | 93 | 76 | 18 | 1.20 | 630 | 91 | 1.10 | 580 | 90 | 1.10 | 600 | Brilliant deep blue |

TABLE 1-continued

| | | | | | | | | | | | |
|---|---|---|---|---|---|---|---|---|---|---|---|
| Example 2 | 95 | 76 | 20 | 1.25 | 640 | 93 | 1.15 | 580 | 90 | 1.15 | 590 | Brilliant deep blue |
| Example 3 | 91 | 73 | 29 | 1.20 | 680 | 90 | 1.00 | 560 | 88 | 1.00 | 540 | Brilliant deep blue |
| Example 4 | 96 | 76 | 18 | 1.25 | 640 | 92 | 1.15 | 580 | 90 | 1.12 | 570 | Brilliant deep blue |
| Comparative Example 1 | 85 | 69 | 38 | 1.00 | 630 | 68 | 0.60 | 390 | 68 | 0.72 | 420 | Brilliant deep blue |
| Comparative Example 2 | 86 | 68 | 50 | 0.90 | 460 | 63 | 0.53 | 360 | 65 | 0.55 | 300 | Dull blue |
| Comparative Example 3 | 93 | 73 | 38 | 1.10 | 650 | 53 | 0.42 | 350 | 55 | 0.40 | 320 | " |
| Comparative Example 4 | 98 | 72 | 39 | 0.90 | 680 | 48 | 0.40 | 300 | 53 | 0.43 | 320 | " |
| Example 5 | 95 | 72 | 24 | 1.20 | 640 | 91 | 1.00 | 540 | 89 | 0.90 | 530 | Brilliant blue |
| Example 6 | 90 | 71 | 26 | 1.20 | 620 | 89 | 1.00 | 550 | 89 | 1.00 | 530 | Brilliant blue |
| Comparative Example 5 | 79 | 65 | 50 | 1.20 | 470 | 70 | 1.00 | 400 | 69 | 0.92 | 400 | Brilliant blue |
| Example 7 | 93 | 70 | 30 | 1.00 | 655 | 90 | 1.00 | 580 | 89 | 1.01 | 600 | Brilliant blue |
| Comparative Example 6 | 80 | 63 | 58 | 0.70 | 480 | 65 | 0.44 | 320 | 62 | 0.42 | 380 | Brilliant blue |
| Example 8 | 88 | 70 | 30 | 1.10 | 620 | 87 | 0.90 | 530 | 87 | 0.92 | 550 | Brilliant blue |

Note:
(*)1 ... Dry heat treatment at a temperature of 160° C. for one minute
(*)2 ... Wet heat treatment in hot water at a temperature of 130° C. for 60 minutes Table 1 clearly shows that the elastic copolymers of the present invention exhibited limiting viscosity numbers of 1.2 or more, melting points of 160° C. or more, and ½ crystallization times of 10 seconds or less, and the elastic copolymer filaments of the invention exhibited satisfactory instantaneous elastic recoveries, tensile modulus of elasticity, permanent sets, tensile strengths, ultimate elongations, and thermal stabilities during dry and wet heat treatments, and excellent dyeing properties.

What is claimed is:

1. A highly elastic, ionic dye-dyeable filament consisting essentially of a polyether-ester block copolymer which is a polymerization product of:
   (A) a dicarboxylic acid component comprising 70 to 100 molar % of at least one member selected from the group consisting of terephthalic acid and ester-forming derivatives thereof and 0 to 30 molar % of at least one member selected from additional dicarboxylic acids other than terephthalic acid and ester-forming derivative thereof;
   (B) 0.1 to 5 molar %, based on the molar amount of the dicarboxylic acid component (A), of a phosphonium sulfonate component comprising at least one quaternary phosphonium sulfonate compound of the formula (I):

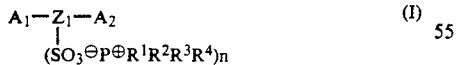

$$A_1-Z_1-A_2 \atop | \atop (SO_3^{\ominus}P^{\oplus}R^1R^2R^3R^4)_n \qquad (I)$$

wherein $Z_1$ represents a member selected from the group consisting of tri- or more valent aromatic and aliphatic groups, $A_1$ represents an ester-forming functional group having a member selected from the group consisting of carboxyl and hydroxyl radicals and ester-forming derivatives thereof, $A_2$ represents a member selected from the group consisting of a hydrogen atom and ester-forming functional groups having a member selected from the group consisting of carboxyl and hydroxyl radicals and ester-forming derivatives thereof, $R^1$, $R^2$, $R^3$ and $R^4$ represent respectively and independently from each other, a member selected from the group consisting of alkyl radicals and aryl radicals, and n represents a positive integer;
   (C) 50 to 80% by weight, based on the total weight of the copolymer, of a polymeric glycol component comprising at least one polytetramethylene glycol having an average molecular weight of 400 to 6000; and
   (D) a monomeric glycol component comprising 70 to 100 molar % of at least one member selected from the group consisting of 1,4-butane diol and ester-forming derivatives thereof and 0 to 30 molar % of at least one member selected from the group consisting of additional aliphatic glycols other than 1,4-butane diol and ester-forming derivatives thereof, said glycol component (D) being in an amount necessary to cause the total molar equivalent of the hydroxyl radicals and ester-forming derivatives thereof in the components (B), (C) and (D) to be substantially equal to the total molar equivalent of the carboxyl radicals and ester-forming derivative thereof in the components (A) and (B), and having a limiting viscosity number of 1.2 or more, a melting point of 160° C. or more and a ½ crystallization time of 10 seconds or less at a temperature of 50° C.

2. The block copolymer as claimed in claim 1, wherein the additional dicarboxylic acids are selected from isophthalic acid, naphthalene dicarboxylic acids, diphenyldicarboxylic acids, diphenoxyethane dicarboxylic acids, β-hydroxyethoxybenzoic acid, p-hydroxybenzoic acid, adipic acid, sebacic acid and 1,4-cyclohexane dicarboxylic acids.

3. The block copolymer as claimed in claim 1, wherein the ester-forming functional groups represented by $A_1$ and $A_2$ in the formula (I) is selected, respectively and independently from each other, from the group consisting of those of the formulae:

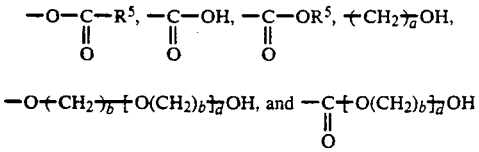

wherein $R^5$ represents a member selected from the group consisting of lower alkyl radicals and a phenyl radical, a and d respectively represent an integer of 1 or more, and b represents an integer of 2 or more.

4. The block copolymer as claimed in claim 1, wherein the phosphonium sulfonate in the phosphonium sulfonate component (B) is selected from the group consisting of tetrabutylphosphonium 3,5-dicarboxybenzene sulfonate, ethyltributylphosphonium 3,5-dicarboxybenzene sulfonate, benzyltributylphosphonium 3,5-dicarboxybenzene sulfonate, phenyltributylphosphonium 3,5-dicarboxybenzene sulfonate, tetraphenylphosphonium 3,5-dicarboxybenzene sulfonate, ethyltriphenylphosphonium 3,5-dicarboxybenzene sulfonate, butyltriphenylphosphonium 3,5-dicarboxybenzene sulfonate, benzyltriphenylphosphonium 3,5-dicarboxybenzene sulfonate, tetrabutylphosphonium 3,5-dicarbomethoxybenzene sulfonate, ethyltributylphosphonium 3,5-dicarbomethoxybenzene sulfonate, benzyltributylphosphonium 3,5-dicarbomethoxybenzene sulfonate, phenyltributylphosphonium 3,5-dicarbomethoxybenzene sulfonate, tetraphenylphosphonium 3,5-dicarbomethoxybenzene sulfonate, ethyltriphenylphosphonium 3,5-dicarbomethoxybenzene sulfonate, butyltriphenylphosphonium 3,5-dicarbomethoxybenzene sulfonate, benzyltriphenylphosphonium 3,5-dicarbomethoxybenzene sulfonate, tetrabutylphosphonium 3-carboxybenzene sulfonate, tetraphenylphosphonium 3-carboxybenzene sulfonate, tetrabutylphosphonium 3-carbomethoxybenzene sulfonate, tetraphenylphosphonium 3-carbomethoxybenzene sulfonate, tetrabutylphosphonium 3,5-di($\beta$-hydroxyethoxycarbonyl)benzene sulfonate, tetraphenylphosphonium 3,5-di($\beta$-hydroxyethoxycarbonyl)benzene sulfonate, tetrabutylphosphonium 3-($\beta$-hydroxyethoxycarbonyl)benzene sulfonate, tetraphenylphosphonium 3-($\beta$-hydroxyethoxycarbonyl)benzene sulfonate, tetrabutylphosphonium 4-hydroxyethoxybenzene sulfonate, tetrabutylphosphonium 2,6-dicarboxynaphthalene-4-sulfonate, and tetrabutylphosphonium $\alpha$-sulfosuccinic acid.

5. The block copolymer as claimed in claim 1, wherein the additional aliphatic glycols in the component (D) are selected from the group consisting of ethylene glycol, 1,3-propane diol, 1,6-hexane diol, diethylene glycol, triethylene glycol and 1,4-cyclohexane dimethanol.

6. A highly elastic, ionic dye-dyeable filament comprising the polyether-ester block copolymer as claimed in claim 1.

* * * * *